United States Patent
Wu

(10) Patent No.: US 11,503,514 B2
(45) Date of Patent: Nov. 15, 2022

(54) MEASUREMENT METHOD, MEASUREMENT CONFIGURATION METHOD, USER EQUIPMENT AND NETWORK DEVICE

(71) Applicant: VIVO MOBILE COMMUNICATION CO., LTD., Chang'an Dongguan (CN)

(72) Inventor: Yumin Wu, Chang'an Dpngguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 91 days.

(21) Appl. No.: 16/980,180

(22) PCT Filed: Feb. 21, 2019

(86) PCT No.: PCT/CN2019/075676
§ 371 (c)(1),
(2) Date: Sep. 11, 2020

(87) PCT Pub. No.: WO2019/174446
PCT Pub. Date: Sep. 19, 2019

(65) Prior Publication Data
US 2021/0014746 A1    Jan. 14, 2021

(30) Foreign Application Priority Data

Mar. 16, 2018 (CN) .......................... 201810218469.0

(51) Int. Cl.
*H04W 4/00* (2018.01)
*H04W 36/00* (2009.01)
(Continued)

(52) U.S. Cl.
CPC ....... *H04W 36/0058* (2018.08); *H04W 24/10* (2013.01); *H04W 36/00837* (2018.08); *H04W 36/305* (2018.08); *H04W 76/11* (2018.02)

(58) Field of Classification Search
None
See application file for complete search history.

(56) References Cited

U.S. PATENT DOCUMENTS

2011/0287767 A1* 11/2011 Huang ................... H04L 43/00
455/436
2013/0021929 A1    1/2013 Kim
(Continued)

FOREIGN PATENT DOCUMENTS

CN        101795468 A    8/2010
CN        101867968 A    10/2010
(Continued)

OTHER PUBLICATIONS

Extended European Search Report for related Application No. 19767966.5; dated Apr. 1, 2021.
(Continued)

*Primary Examiner* — Suhail Khan
(74) *Attorney, Agent, or Firm* — von Briesen & Roper, s.c.

(57) ABSTRACT

The present disclosure provides a measurement method, a measurement configuration method, a user equipment and a network device. The method includes: receiving measurement object configuration information; when adopting conditional trigger cell management, according to the measurement object configuration information, starting measurement of a target object; wherein the target object is at least one of objects indicated by the measurement object configuration information; when satisfying a preset trigger event, determining whether to stop measurement of at least one object in the target object.

20 Claims, 3 Drawing Sheets

(51) Int. Cl.
*H04W 76/11* (2018.01)
*H04W 36/30* (2009.01)
*H04W 24/10* (2009.01)

(56) References Cited

U.S. PATENT DOCUMENTS

2013/0229931 A1   9/2013   Kim
2015/0133121 A1   5/2015   Li et al.

FOREIGN PATENT DOCUMENTS

| CN | 10998482 A | 3/2011 |
| CN | 102869025 A | 1/2013 |
| CN | 103945408 A | 7/2014 |
| WO | 2015026286 A1 | 2/2015 |

OTHER PUBLICATIONS

ZTE Corporation, Sanechips, "Discussion on single connected handover", Feb. 26-Mar. 2, 2018, 3GPP TSG-RAN WG2 Meeting #101, Athens, Greece.
LG Electronics Inc., "Conditional handover procedure", Feb. 26-Mar. 2, 2018, 3GPP TSG-RAN2#101, Athens, Greece.
Interdigital Communications, "Conditional Reconfiguration for NR", Feb. 26-Mar. 2, 2018, 3GPP TSG-RAN WG2 Meeting #101, Athens, Greece.
Ericsson, "Conditional Handover", Feb. 26-Mar. 2, 2018, 3GPP TSG-RAN WG2 #101, Athens, Greece.
International Search Report & Written Opinion related to Application No. PCT/CN2019/075676; dated Oct. 1, 2020.
Notice of Reasons for Refusal for related Japanese Application No. 2020-572594; dated Nov. 9, 2021.

\* cited by examiner

MEASUREMENT METHOD, MEASUREMENT CONFIGURATION METHOD, USER EQUIPMENT AND NETWORK DEVICE

CROSS-REFERENCE TO RELATED APPLICATION

This application is the U.S. national phase of PCT Application PCT/CN2019/075676 filed on Feb. 21, 2019, which claims the benefit and priority of Chinese Application No. 201810218469.0, filed on Mar. 16, 2018, the disclosures of which are incorporated in their entirety by reference herein.

TECHNICAL FIELD

The present disclosure relates to the field of communications technology, and in particular to a measurement method, a measurement configuration method, a user equipment and a network device.

BACKGROUND

In a traditional long term evolution (Long Term Evolution, LTE) communication system, a network device performs a measurement configuration for a user equipment through a radio resource control (Radio Resource Control, RRC) connection reconfiguration message. According to measurement configuration information, the user equipment (User Equipment, UE) performs measurement evaluation and report for channels of a local cell and neighboring cells. Specifically, when the LTE system configures a measurement report, a configuration content includes a measurement object configuration and a measurement report configuration. A network device establishes association relationship configuration information between the measurement report configuration (reportConfigId) and the measurement object (measObjectId) through a measurement identity (measID), and transmits the association relationship configuration information to the UE. The UE determines that if there is the association relationship configuration information, the UE starts measurement of a measurement object specified by the association relationship configuration information.

In the new radio (New radio, NR) communication system, a conditional trigger mode is introduced for cell management, such as cell addition, cell modification, cell deletion and cell change. Taking conditional trigger cell handover as an example, as shown in FIG. 1, main steps of a conditional handover procedure include:

Step 1: a source (Source) node transmits handover request information to one or more target nodes (Target 1 and Target 2).

Step 2: the target node transmits handover confirmation information to the source node.

Step 3: the source node transmits configuration information of a conditional handover to a UE.

Step 4: the UE evaluates whether target cells satisfy a condition, and selects a corresponding target cell for handover after determining that the condition is met.

Step 5: the UE initiates a random access procedure after the target cell is selected.

Step 6: the UE transmits handover completion information to the target node.

Step 7: the source node transmits cancellation conditional handover information to other target node.

Step 8: the other target node transmits conditional handover cancellation confirmation information to the source node.

When the conditional trigger mode is used for cell management, the UE cannot determine when to start or stop measuring cells related to the conditional trigger. If the measurement of the relevant cells is not timely, it will lead to failure of cell management. If the measurement of the relevant cells is continued, it will increase power consumption of the UE.

SUMMARY

Embodiments of the present disclosure provide a measurement method, a measurement configuration method, a user equipment and a network device, which can solve the problem of conditional trigger measurement of related cells.

In a first aspect, one embodiment of the present disclosure provides a measurement method, operable by a user equipment (UE) and including:
receiving measurement object configuration information;
when adopting conditional trigger cell management, according to the measurement object configuration information, starting measurement of a target object; wherein the target object is at least one of objects indicated by the measurement object configuration information;
when satisfying a preset trigger event, determining whether to stop measurement of at least one object in the target object.

In a second aspect, one embodiment of the present disclosure provides a user equipment (UE), including:
a receiving module configured to receive measurement object configuration information;
a startup module configured to, when adopting conditional trigger cell management, according to the measurement object configuration information, start measurement of a target object; wherein the target object is at least one of objects indicated by the measurement object configuration information;
a processing module configured to, when satisfying a preset trigger event, determine whether to stop measurement of at least one object in the target object.

In a third aspect, one embodiment of the present disclosure provides a user equipment (UE), including: a processor, a memory, and a computer program stored on the memory and executable on the processor; wherein the computer program is executed by a processor to implement steps of the above measurement method.

In a fourth aspect, one embodiment of the present disclosure provides a computer readable storage medium, including a computer program stored thereon; wherein the computer program is executed by a processor to implement steps of the measurement method.

In a fifth aspect, one embodiment of the present disclosure provides a measurement configuration method, operable by a network device, including: transmitting measurement object configuration information; wherein the measurement object configuration information is used to indicate a target object associated with conditional trigger cell management.

In a sixth aspect, one embodiment of the present disclosure provides a network device, including:
a transmission module configured to transmit measurement object configuration information; wherein the measurement object configuration information is used to indicate a target object associated with conditional trigger cell management.

In a seventh aspect, one embodiment of the present disclosure provides a network device, including: a processor, a memory, and a computer program stored on the memory and executable on the processor; wherein the processor executes the computer program to implement steps of the above measurement configuration method.

In an eighth aspect, one embodiment of the present disclosure provides a computer readable storage medium, including a computer program stored thereon; wherein the computer program is executed by a processor to steps of the above measurement configuration method.

Thus, when the UE according to one embodiment of the present disclosure adopts conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

BRIEF DESCRIPTION OF DRAWINGS

In order to explain the technical solutions of the embodiments of the present disclosure more clearly, the drawings used in the description of the embodiments of the present disclosure are briefly introduced below. Obviously, the drawings in the following description are just some embodiments of the present disclosure. For those of ordinary skill in the art, other drawings may be readily obtained by a person of ordinary skill in the art.

DETAILED DESCRIPTION

Figure 1:
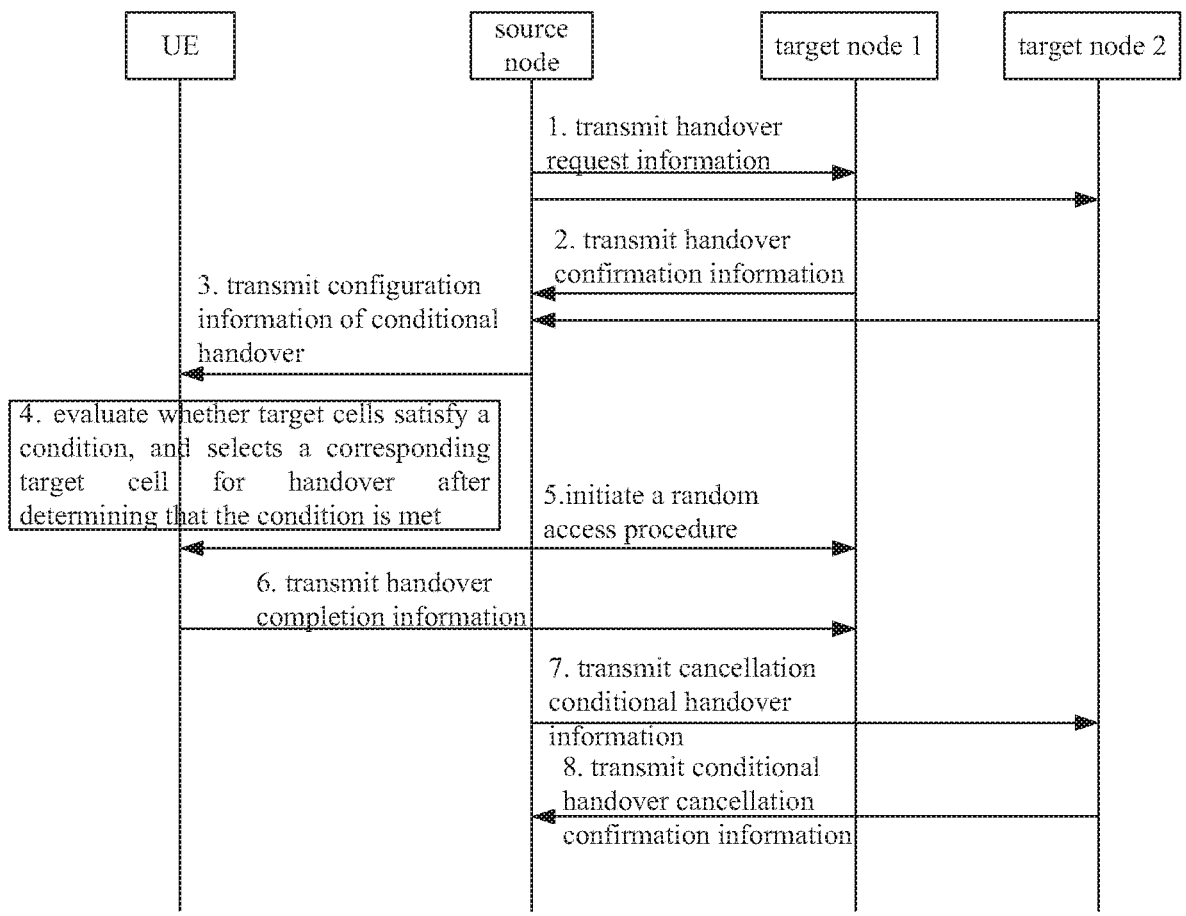
FIG. 1 is a schematic flow chart showing a cell handover based on conditional trigger.

Exemplary embodiments of the present disclosure are described in details hereinafter with reference to the accompanying drawings. Although the exemplary embodiments of the present disclosure are shown in the drawings, it should be understood that the present disclosure may be implemented in various forms and should not be limited by the embodiments set forth herein. On the contrary, these embodiments are provided to enable a more thorough understanding of the present disclosure and to fully convey the scope of the present disclosure to those skilled in the art.

The terms such as "first" and "second" used in the specification and claims are merely used to differentiate similar components rather than to represent any order or number. It is to be understood that the data so used may be interchanged where appropriate, such that the embodiments of the present application described herein may be implemented in a sequence other than those illustrated or described herein. In addition, the terms "include" and "have" or their variations are intended to encompass a non-exclusive inclusion, such that a process, method, system, product, or device that include a series of steps or units include not only those steps or units that are explicitly listed but also other steps or units that are not explicitly listed, or steps or units that are inherent to such process, method, product, or device.

Figure 2:
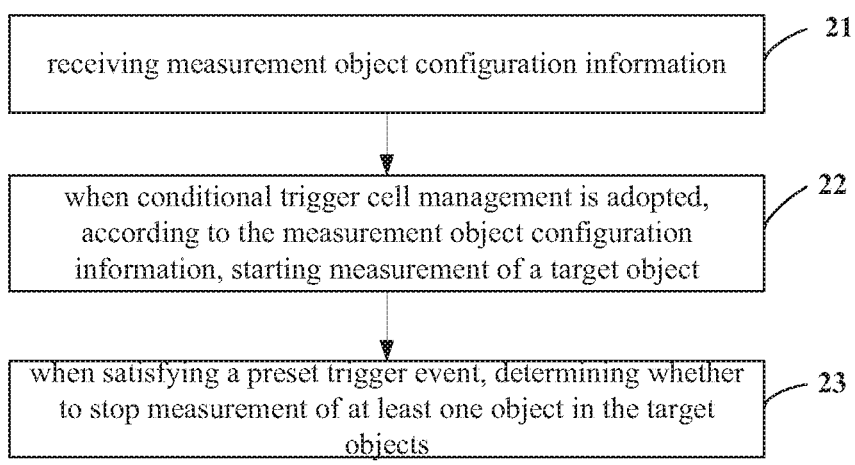
FIG. 2 is a schematic flow chart of a measurement method according to an embodiment of the present disclosure.

One embodiment of the present disclosure provides a measurement method, which is operable by a user equipment. As shown in FIG. 2, the method includes the following steps.

Step 21: receiving measurement object configuration information.

The measurement object configuration information includes a target object that is associated with conditional trigger cell management. The measurement object configuration information may be separately configured by the network device, or may be configured through measurement configuration information, i.e., the measurement configuration information carries the measurement object configuration information.

Step 22: when conditional trigger cell management is adopted, according to the measurement object configuration information, starting measurement of a target object.

The network device notifies the UE to use conditional trigger mode for cell management through explicit or implicit notification. For example, the network device may notify the UE to use conditional trigger mode for cell management through dedicated signaling (such as RRC signaling). The target object includes a target cell or target frequency. The target object is at least one of Objects indicated by the measurement object configuration information. That is to say, in addition to the measurement object associated with the conditional trigger cell management, the measurement object configuration information may further carry measurement objects related to other measurements. For other measurements, the network device establishes association relationship configuration information between a measurement report configuration (reportConfigId) and a measurement object (measObjectId) through a measurement identity (measID), and transmits the association relationship configuration information to the UE. When the UE detects the association relationship configuration information, the UE starts measurement of a measurement object specified by the association relationship configuration information.

Optionally, when the conditional trigger cell management is adopted, after receiving the measurement configuration information transmitted by the network device, the measurement of the target object indicated by the measurement object configuration information may be directly started. The target object is at least a portion of objects indicated by the measurement object configuration information. In particular, the target object is a cell or frequency associated with the conditional trigger cell management indicated by the measurement object configuration information.

Step 23: when satisfying a preset trigger event, determining whether to stop measurement of at least one object in the target objects.

The UE may stop or continue the measurement according to the preset trigger event or referred to as a trigger condition).

If the UE needs to manage cells (including: adding, modifying, deleting, or changing a corresponding cell) according to the conditional trigger mode, the network device transmits a corresponding trigger condition configuration to the UE. If the "trigger condition configuration" includes evaluation of measurement results of one or more cells or frequencies, the measurement configuration information of the one or more cells or frequencies is configured by the network device or predefined by agreements. The measurement configuration information includes one or any combination of the following: an explicit measurement object configuration and an implicit measurement object configuration.

For the explicit measurement object configuration or the implicit measurement object configuration, the corresponding measurement report configuration (i.e., reportConfigId) and/or measurement identity configuration (i.e., measId) may not be configured.

The measurement object configuration information includes at least one of the following:

information of a cell identity that does not need to be measured;

information of a frequency identity of the target object, where, for the implicit measurement object configuration, the frequency identity may be frequency identity carried in the trigger condition configuration;

information of a cell identity of the target object, where, for the implicit measurement object configuration, the cell identity may be a cell identity carried in the trigger condition configuration;

first indication information indicating whether the measurement object is applied for the conditional trigger cell management, i.e., indication information configured to indicate whether the measurement object is applied for the conditional trigger cell management; where according to the first indication information in the measurement object configuration information, the UE may determine which object is applied for the conditional trigger cell management and start measurement of the corresponding object. For example, when the first indication information is "1", it indicates that the measurement object is used for measurement of the conditional trigger cell management, and then a measurement result of the measurement object may have no corresponding measurement report; when the first indication information is "0", it indicates that the measurement object is used for other measurement, and then a measurement result of the measurement object has a corresponding measurement report;

reference signal configuration information corresponding to the target object, such as location of a synchronous signal block (Synchronous Signal Block, SSB) or a channel state information-reference signal (Channel State Information-Reference Signal, CSI-RS);

layer-3 filter configuration information of the target object, such as a filter coefficient (filter Coefficient);

information of measurement result type of the target object, where the measurement result type includes, but is not limited to, at least one of the following: reference symbol received power (Reference Symbol Received Power, RSRP), reference signal received quality (Reference Signal Received Quality, RSRQ), and signal to interference and noise ratio (Signal to Interference and Noise Ratio, SINR);

a second indication information indicating whether to continue measurement after satisfying at least one preset trigger event, i.e., indication information indicating whether to continue measurement after one or more preset trigger events (trigger conditions) are satisfied; for example, indicating whether measurement of a certain frequency or cell continues after the UE completes the conditional handover.

The preset trigger event is predefined, or the preset trigger event is configured by the network device. Optionally, the network device can use the measurement configuration information to carry the preset trigger event for stopping measurement. The preset trigger event includes at least one of a cell handover success, a cell handover failure, a target secondary cell group (Secondary Cell Group, SCG) access success, a target SCG access failure, and a radio link failure. In the 5G system, the UE adopts a dual connectivity (Dual Connectivity, DC) architecture, including: a master cell group (Master Cell Group, MCG) and an SCG. The MCG is corresponding to a master node (Master Node, MN) on the network side. The SCG is corresponding to a secondary node (Secondary Node, SN) on the network side. The MCG includes a primary cell (Primary cell, PCell) and a secondary cell (Secondary Cell, SCell). The SCG includes a primary-secondary cell (PSCell) and a secondary cell (SCell). PCell and PSCell may also be collectively referred to as SpCell.

Optionally, the step 23 may be implemented by, but not limited to, the following modes.

First mode: when satisfying the preset trigger event, determining to stop the measurement of all the target objects.

That is, after the handover is successful, stopping the measurement of all the target objects associated with the conditional trigger cell management indicated by the measurement object configuration information;

after the handover fails, stopping the measurement of all the target objects associated with the conditional trigger cell management indicated by the measurement object configuration information;

after one target SCG successfully accesses, stopping the measurement of all the target objects associated with the conditional trigger cell management indicated by the measurement object configuration information;

after one target SCG fails to access (such as SCG failure), stopping the measurement of all the target objects associated with the conditional trigger cell management indicated by the measurement object configuration information;

after a radio link fails, stopping the measurement of all the target objects associated with the conditional trigger cell management indicated by the measurement object configuration information.

Second mode: in case that the preset trigger event includes a cell handover success or a target SCG access success, when the cell handover is successful or the target SCG successfully accesses, determining to stop measurement of objects except for a current serving cell in the target objects.

That is, after the handover is successful, stopping the measurement of all the target objects associated with the conditional trigger cell management indicated by the measurement object configuration information except for the serving cell; or, after one target SCG successfully accesses, stopping the measurement of all the target objects associated with the conditional trigger cell management indicated by the measurement object configuration information except for the serving cell.

Third mode: in case that the measurement object configuration information includes the second indication information, when satisfying the preset trigger event, determining whether to stop measurement of at least one object of the target objects according to the second indication information.

That is, according to the second indication information in the measurement object configuration information, for example, indication information of stopping or continuing measurement of one target object, after the preset trigger event is satisfied, stopping or continuing measurement of those target objects indicated by the second indication information. For example, after a certain preset trigger condition is satisfied, stopping the measurement of all the target objects associated with the conditional trigger cell management indicated by the measurement object configuration information except for an object that continues to be measured as indicated by the second indication information (for example, indication information of whether to continue measurement).

Fourth mode: in case that the measurement object configuration information includes the second indication information, when satisfying the preset trigger event and completing a configuration procedure for the target object, determining whether to stop measurement of at least one object of the target objects according to the second indication information.

That is, according to the second indication information in the measurement object configuration information, for example, indication information of stopping or continuing measurement of one target object, after the preset trigger event is satisfied and the configuration procedure for the target object is successfully completed (for example, the handover is successful), stopping or continuing measurement of those target objects indicated by the second indication information.

In the third mode and the fourth mode, the step of determining whether to stop measurement of at least one object of the target objects according to the second indication information, includes one of the following:

according to a first target object that needs to continue to be measured as indicated by the second indication information, determining to continue measurement of the first target object; for example, after the handover is successful, when the second indication information indicates that measurement of some cells continues, the measurement of these cells continues; or, after one SCG successfully accesses, when the second indication information indicates that measurement of some cells continues, the measurement of these cells continues; in addition, when the UE continues the measurement of the first target object, the UE may further stop the measurement of all the target objects associated with the conditional trigger cell management indicated by the measurement object configuration information except for the first target object;

according to a second target object that does not need to continue to be measured as indicated by the second indication information, determining to stop measurement of the second target object; for example, after the handover is successful, when the second indication information indicates that measurement of some cells stops (i.e., not to continue), the measurement of these cells stops; or, after one SCG successfully accesses, when the second indication information indicates that measurement of some cells stops, the measurement of these cells stops;

according to the first target object that needs to continue to be measured as indicated by the second indication information, determining to stop measurement of other objects except for the first target object in the target objects; for example, after the handover is successful, stopping the measurement of all the target objects associated with the conditional trigger cell management indicated by the measurement object configuration information except for the first target object as indicated by the second indication information (for example, continuing measurement of some target objects); or, after one SCG successfully accesses, stopping the measurement of all the target objects associated with the conditional trigger cell management indicated by the measurement object configuration information except for the first target object as indicated by the second indication information (for example, continuing measurement of some target objects).

Optionally, when the preset trigger event includes the cell handover success or the target SCG access success, the first target object includes the current serving cell. With an example of determining to continue measurement of the first target object according to the first target object that needs to continue to be measured as indicated by the second indication information, after the handover is successful, when the second indication information indicates that measurement of a serving cell continues, the measurement of this serving cell continues; or, after an SCG successfully accesses, when the second indication information indicates that measurement of a serving cell continues, the measurement of this serving cell continues. In addition, when the UE continues the measurement of the serving cell, the UE may further stop the measurement of all the target objects associated with the conditional trigger cell management indicated by the measurement object configuration information except for the serving cell.

In the measurement method according to one embodiment of the present disclosure, when the UE adopts conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

The foregoing embodiments illustrate the measurement method in different scenarios, and the corresponding UE will be further described below with reference to the accompanying drawings.

Figure 3:
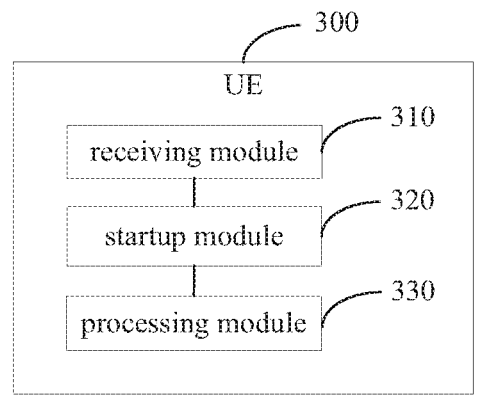
FIG. 3 is a schematic structural diagram of modules of a user equipment according to an embodiment of the present disclosure.

As shown in FIG. 3, a UE 300 according to an embodiment of the present disclosure can implement details of the measurement method in the above embodiment, and achieve the same effect, such as receiving measurement object configuration information; when conditional trigger cell management is adopted, according to the measurement object configuration information, starting measurement of a target object; when satisfying a preset trigger event, determining whether to stop measurement of at least one object in the target objects. The UE 300 specifically includes the following functional modules:

a receiving module 310 configured to receive measurement object configuration information;

a startup module 320 configured to, when conditional trigger cell management is adopted, according to the measurement object configuration information, start measurement of a target object; where the target object is at least one of objects indicated by the measurement object configuration information;

a processing module 330 configured to, when satisfying a preset trigger event, determine whether to stop measurement of at least one object in the target objects.

The measurement object configuration information includes at least one of the following:

information of a cell identity that does not need to be measured;

information of a frequency identity of the target object;

information of a cell identity of the target object;

first indication information indicating whether the measurement object is applied for the conditional trigger cell management;

reference signal configuration information corresponding to the target object;

layer-3 filter configuration information of the target object;

information of measurement result type of the target object;

a second indication information indicating whether to continue measurement after satisfying at least one preset trigger event.

The preset trigger event is predefined, or the preset trigger event is configured by the network device.

The preset trigger event includes at least one of a cell handover success, a cell handover failure, a target secondary cell group (SCG) access success, a target SCG access failure, and a radio link failure.

The processing module 330 includes:

a first determining submodule configured to, when satisfying the preset trigger event, determine to stop the measurement of all the target objects.

The processing module 330 farther includes:

a second determining submodule configured to, in case that the preset trigger event includes a cell handover success or a target SCG access success, when the cell handover is successful or the target SCG successfully accesses, determine to stop measurement of objects except for a current serving cell in the target objects.

When the measurement object configuration information includes second indication information, the processing module 330 further includes one of the following:

a third determining submodule configured to, when satisfying the preset trigger event, determine whether to stop measurement of at least one object of the target objects according to the second indication information;

a fourth determining submodule configured to, when satisfying the preset trigger event and completing a configuration procedure for the target object, determine whether to stop measurement of at least one object of the target objects according to the second indication information.

The third determining submodule or the fourth determining submodule includes one of the following:

a first determining unit configured to, according to a first target object that needs to continue to be measured as indicated by the second indication information, determine to continue measurement of the first target object;

a second determining unit configured to, according to a second target object that does not need to continue to be measured as indicated by the second indication information, determine to stop measurement of the second target object;

a third determining unit configured to, according to the first target object that needs to continue to be measured as indicated by the second indication information, determine to stop measurement of other objects except for the first target object in the target objects.

When the preset trigger event includes the cell handover success or the target SCG access success, the first target object includes the current serving cell.

It is to be noted that, when the UE according to one embodiment of the present disclosure adopts conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

Figure 4:
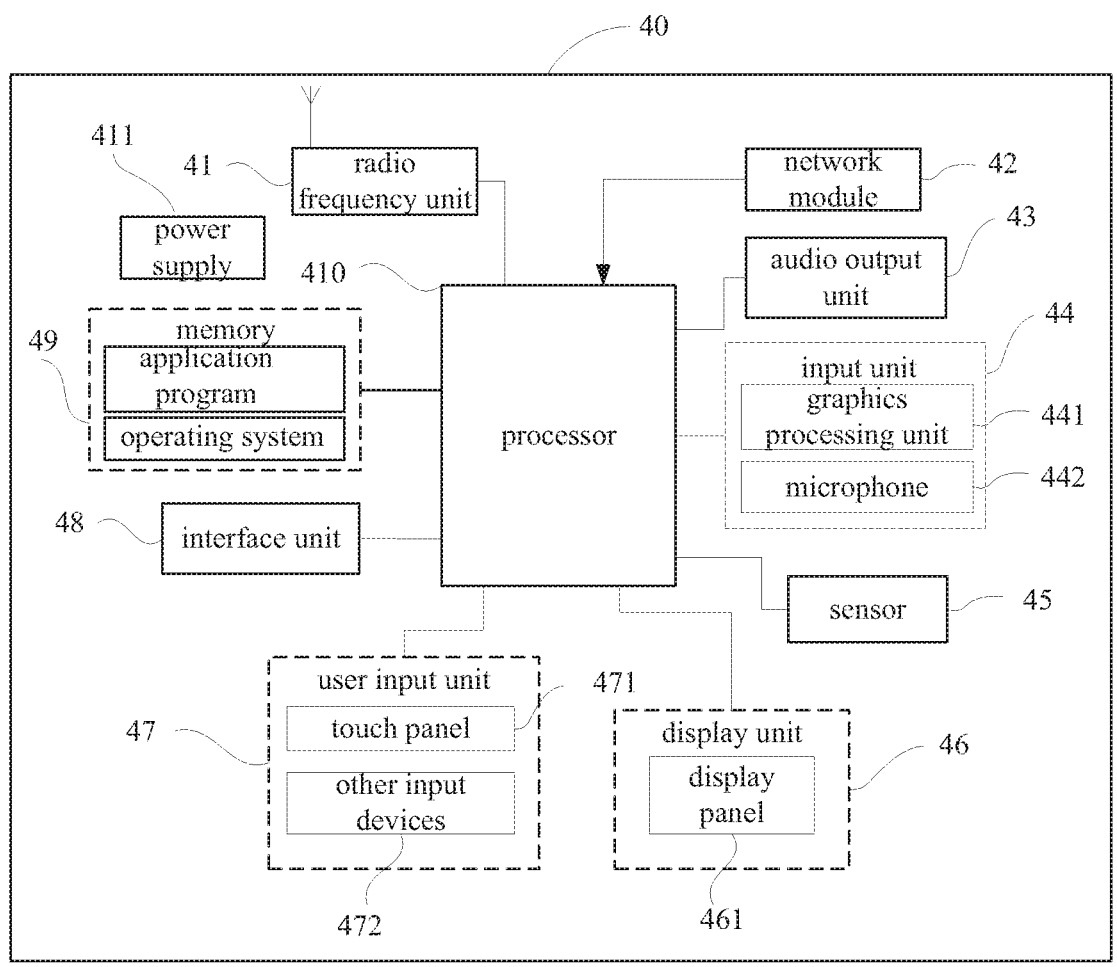
FIG. 4 is a block diagram of a user equipment according to an embodiment of the present disclosure.

In order to better achieve the above purpose, further, FIG. 4 is a schematic diagram of a hardware structure of a user equipment (UE) implementing various embodiments of the present disclosure. The UE 40 includes, but is not limited to, a radio frequency unit 41, a network module 42, an audio output unit 43, an input unit 44, a sensor 45, a display unit 46, a user input unit 47, an interface unit 48, a memory 49, a processor 410, and a power supply 411. It will be appreciated by those skilled in the art that structures of the UE shown in FIG. 4 do not constitute a limitation of a UE, which may include more or fewer components than illustrated, or have some components combined, or different component arrangements. In one embodiment of the present disclosure, the 42 includes, but is not limited to, a mobile phone, a tablet computer, a notebook computer, a palmtop computer, an in-vehicle terminal, a wearable device, a pedometer, and the like.

The radio frequency unit 41 is configured to receive measurement object configuration information;

The processor 410 is configured to, when conditional trigger cell management is adopted, according to the measurement object configuration information, start measurement of a target object; where the target object is at least one of objects indicated by the measurement object configuration information; when satisfying a preset trigger event, determine whether to stop measurement of at least one object in the target objects.

When the UE according to one embodiment of the present disclosure adopts conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

It should be understood that in some embodiments of the present disclosure, the radio frequency unit 41 may be used to receive and transmit signals during receiving and transmitting information or a call. Specifically, the radio frequency unit 41 receives downlink data from a base station and then transmits the downlink data to the processor 410 for processing. Uplink data is transmitted to the base station. Generally, the radio frequency unit 41 includes, but is not limited to, an antenna, at least one amplifier, a transceiver, a coupler, a low noise amplifier, a duplexer, and the like. In addition, the radio frequency unit 41 may also communicate with the network and other devices through a wireless communication system.

The UE provides wireless broadband internet access to the user through the network module 42, such as assisting the user in receiving and transmitting email, browsing web pages, and accessing streaming media.

The audio output unit 43 may convert the audio data received by the radio frequency unit 41 or the network module 42 or stored in the memory 49 into an audio signal and output as sound. Moreover, the audio output unit 43 may also provide audio output (e.g., call signal reception sound, message reception sound, etc.) related to a specific function performed by the UE 40. The audio output unit 43 includes a speaker, a buzzer, a receiver, and the like.

The input unit 44 is used for receiving an audio or video signal. The input unit 44 may include a graphics processing unit (Graphics Processing Unit, GPU) 441 and a microphone 442. The GPU 441 processes image data of static pictures or videos obtained by an image capturing apparatus (such as a camera) in a video capturing mode or an image capturing mode. The processed image frame may be displayed on the display unit 46. The image frames processed by the graphics processor 441 may be stored in the memory 49 (or other storage medium) or transmitted via the radio frequency unit 41 or the network module 42. The microphone 442 can receive sound and can process such sound into audio data. The processed audio data may be converted into a format output that may be transmitted to the mobile communication base station via the radio frequency unit 41 in the case of a telephone talk mode.

The UE 40 further includes at least one sensor 45, such as a light sensor, a motion sensor, and other sensors. Specifically, the light sensor includes an ambient light sensor and a proximity sensor. The ambient light sensor can adjust brightness of a display panel 461 according to the brightness of the ambient light. The proximity sensor can turn off the display panel 461 and/or backlight when the UE 40 moves to the ear. As one of the motion sensors, an accelerometer sensor can detect the magnitude of the acceleration in each direction (generally three axes), can detect the magnitude and direction of the gravity when stationary, and can be used to identify the attitude of the UE (such as horizontal/vertical screen switching, related games, magnetometer attitude calibration), vibration identification related functions (such as pedometer, knocking), and the like. The sensor 45 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 46 is used to display information input by or provided to the user. The display unit 46 may include a display panel 461, which may be configured in the form of a liquid crystal display (Liquid Crystal Display, LCD), an organic light-emitting diode (Organic Light-Emitting Diode, OLED), or the like.

The user input unit 47 may be used to receive the input number or character information, and to generate a key signal input related to the user setting and the function control of the UE. Specifically, the user input unit 47 includes a touch panel 471 and other input devices 472. The touch panel 471, also referred to as a touch screen, may collect touch operations on or near the touch panel (e.g., operations on or near the touch panel 471 using any suitable object or accessory, such as a finger, stylus, or the like). The touch panel 471 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 410, receives commands from the processor 410 and execute them. In addition, the touch panel 471 may be implemented in various types such as a resistive type, a capacitive type, an infrared ray, and a surface acoustic wave. In addition to the touch panel 471, the user input unit 47 may further include other input devices 472. Specifically, other input devices 472 may include, but are not limited to, a physical keyboard, a function key (such as a volume control key, an on-off key), a trackball, a mouse, and a joystick, which will not be elaborated herein.

Further, the touch panel 471 may be overlaid on the display panel 461. When the touch panel 471 detects a touch operation on or near the touch panel, the touch panel 471 transmits it to the processor 410 to determine a type of a touch event. Then, the processor 410 provides a corresponding visual output on the display panel 461 according to the type of the touch event. Although in FIG. 4, the touch panel 471 and the display panel 461 are implemented as two separate components to implement the input and output functions of the UE, in some embodiments, the touch panel 471 and the display panel 461 may be integrated to implement the input and output functions of the UE, which are not specifically limited herein.

The interface unit 48 is an interface through which an external device is connected to the UE 40. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 48 may be used to receive input (e.g., data information, power, etc) from the external device and transmit the received input to one or more elements within the UE 40 or may be used to transmit data between the UE 40 and the external device.

The memory 49 may be used to store software programs and various data. The memory 49 may mainly include a program storage area and a data storage area. The program storage area may store an operating system, an application program (such as a sound play function, an image play function) required by at least one function, and the like. The data storage area may store data (such as audio data, a phone book) created according to use of the UE. In addition, the memory 49 may include high speed random access memory, and may also include non-volatile memory, such as at least one magnetic disk storage device, flash memory device, or other volatile solid state storage device.

The processor 410 is a control center of the UE, connects various parts of the entire UE by various interfaces and lines, executes various functions of the UE and processes data by running or executing software programs and/or modules stored in the memory 49 and invoking data stored in the memory 49, thereby performing overall monitoring of the UE. The processor 410 may include one or more processing units. Optionally, the processor 410 may integrate an application processor and a modem processor. The application processor primarily processes the operating system, the user interface and the application program. The modem processor primarily processes wireless communications. It will be appreciated that the modem processor may also not be integrated into the processor 410.

The UE 40 may further include a power source 411 (such as a battery) that supplies power to the various components. Optionally, the power source 411 may be logically connected to the processor 410 through a power management system to perform functions such as managing charging, discharging, and power consumption management through the power management system.

In addition, the UE 40 includes functional modules not shown, which will not be elaborated herein.

Optionally, one embodiment of the present disclosure further provides a UE including a processor 410, a memory 49, and a computer program stored in the memory 49 and executable on the processor 410. When the computer program is executed by the processor 410, each of the processes in the measurement method of the above embodiment is implemented, and the same technical effect can be achieved. To avoid repetition, details are not described herein. The UE may be a wireless terminal or a wired terminal, and the wireless terminal may be a device that provides voice and/or other service data connectivity to the user, a handheld device with a wireless connection function, or other processing device connected to the wireless modem. The wireless terminal may communicate with one or more core networks via a radio access network (Radio Access Network, RAN). The wireless terminal may be a mobile terminal, such as a mobile phone (or "cellular" phone) and a computer with a mobile terminal, such as a portable, pocket-sized, handheld, built-in computer or in-vehicle mobile device that exchanges language and/or data with a wireless access network. For example, the UE may be a personal communication service (Personal Communication Service, PCS) phones, cordless phones, session initiation protocol (Session Initiation Protocol, SIP) phones, wireless local loop (Wireless Local Loop, WLL) stations, personal digital assistants (Personal Digital Assistant, PDA) and other devices. The wireless terminal may also be referred to as a system, a subscriber unit (Subscriber Unit), a subscriber station (Subscriber Station), a mobile station (Mobile Station), Mobile (Mobile), a rewrote station (Remote Station), a remote terminal (Remote Terminal), an access terminal (Access Terminal), user terminal (User Terminal), user agent (User Agent), user equipment (User Device or User Equipment), which are not limited herein.

One embodiment of the present disclosure further provides a computer readable storage medium. The computer readable storage medium stores a computer program. The computer program is executed by the processor to implement various processes of the foregoing measurement method embodiments, and can achieve the same technical effect. To avoid repetition, details are not described herein. The computer readable storage medium, may be, for example, a read-only memory (ROM), a random access memory (Random Access Memory, RAM), a magnetic disk, or an optical disk.

The above embodiment illustrates the measurement method for the UE of the present disclosure. The following embodiment will further illustrate a measurement configuration method for a network device with reference to the accompanying drawings.

Figure 5:
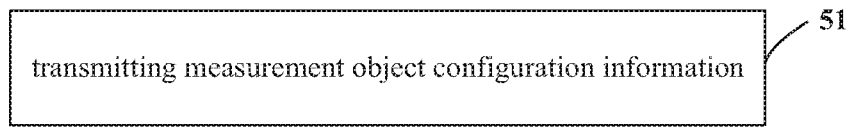
FIG. 5 is a schematic flow chart of a measurement configuration method according to an embodiment of the present disclosure.

As shown in FIG. 5, a measurement configuration method according to one embodiment of the present disclosure, is operable by a network device, and includes the following steps.

Step 51: transmitting measurement object configuration information.

The measurement object configuration information is used to indicate a target object associated with conditional trigger cell management. The target object includes a target cell or target frequency. It is worth noting that the measurement object configuration information may carry measurement objects related to other measurements in addition to measurement objects associated with the conditional trigger cell management. Thus, the target object is at least one of objects indicated by the measurement object configuration information.

When the conditional trigger cell management is adopted, after the UE receives the measurement object configuration information transmitted by the network device, the UE may directly start measurement of a measurement object specified by the measurement object configuration information.

The measurement object configuration information includes at least one of the following:

information of a cell identity that does not need to be measured;

information of a frequency identity of the target object, where, for the implicit measurement object configuration, the frequency identity may be frequency identity carried in the trigger condition configuration;

information of a cell identity of the target object, where, for the implicit measurement object configuration, the cell identity may be a cell identity carried in the trigger condition configuration;

first indication information indicating whether the measurement object is applied for the conditional trigger cell management, i.e., indication information configured to indicate whether the measurement object is applied for the conditional trigger cell management; where according to the first indication information in the measurement object configuration information, the UE may determine which object is applied for the conditional trigger cell management and start measurement of the corresponding object;

reference signal configuration information corresponding to the target object, such as location of a synchronous signal block (Synchronous Signal Block, SSB) or a channel state information-reference signal (Channel State Information-Reference Signal, CSI-RS);

layer-3 filter configuration information of the target object, such as a filter coefficient (filter Coefficient);

information of measurement result type of the target object, where the measurement result type includes, but is not limited to, at least one of the following: reference symbol received power (Reference Symbol Received Power, RSRP), reference signal received quality (Reference Signal Received Quality, RSRQ), and signal to interference and noise ratio (Signal to interference and Noise Ratio, SINR);

a second indication information indicating whether to continue measurement after satisfying at least one preset trigger event, i.e., indication information indicating whether to continue measurement after one or more preset trigger events (trigger conditions) are satisfied.

Optionally, the measurement configuration method further includes: configuring a preset trigger event for the UE to enable the UE to determine whether to stop measurement of at least one object in the target objects when the preset trigger event is satisfied. In this way, the UE may stop or continue the measurement according to the preset trigger event (or referred to as a trigger condition). In addition to configuring the preset trigger event by the network device, the preset trigger event may also be predefined by agreements. The preset trigger event includes at least one of a cell handover success, a cell handover failure, a target secondary cell group (Secondary Cell Group, SCG) access success, a target SCG access failure, and a radio link failure.

The preset trigger event is used to enable the UE to determine to stop measurement of all the target objects when the preset trigger event is satisfied, then, after the handover is successful, the UE stops the measurement of all the target objects associated with the conditional trigger cell management indicated by the measurement object configuration information;

after the handover fails, the UE stops the measurement of all the target objects associated with the conditional trigger cell management indicated by the measurement object configuration information;

after one target SCG successfully accesses, the UE stops the measurement of all the target objects associated with the conditional trigger cell management indicated by the measurement object configuration information;

after one target SCG fails to access such as SCG failure), the UE stops the measurement of all the target objects associated with the conditional trigger cell management indicated by the measurement object configuration information;

after a radio link fails, the UE stops the measurement of all the target objects associated with the conditional trigger cell management indicated by the measurement object configuration information.

In case that the preset trigger event includes a cell handover success or a target SCG access success, the preset trigger event is used to enable the UE to determine to stop measurement of objects except for a current serving cell in the target objects, when the cell handover is successful or the target SCG successfully accesses. In this way, after the handover is successful, the UE stops the measurement of all the target objects associated with the conditional trigger cell management indicated by the measurement object configuration information except for the serving cell; or, after one target SCG successfully accesses, the UE stops the measurement of all the target objects associated with the conditional trigger cell management indicated by the measurement object configuration information except for the serving cell.

When the measurement object configuration information includes the second indication information, the preset trigger event is used to:

enable the UE to determine whether to stop measurement of at least one object of the target objects according to the second indication information when satisfying the preset trigger event; in this way, after the preset trigger event is satisfied, the UE stops or continues measurement of those target objects indicated by the second indication information;

enable the UE to determine whether to stop measurement of at least one object of the target objects according to the second indication information when satisfying the preset trigger event and completing a configuration procedure for the target object; in this way, after the preset trigger event is satisfied and the configuration procedure for the target object is successfully completed (for example the handover is successful), the UE stops or continues measurement of those target objects indicated by the second indication information.

Specifically, the preset trigger event is used to:

according to a first target object that needs to continue to be measured as indicated by the second indication information, enable the UE to determine to continue measurement of the first target object; in this way, the UE determines to continue measurement of the first target object according to the first target object that needs to continue to be measured as indicated by the second indication information; for example, after the handover is successful, when the second indication information indicates that measurement of some cells continues, the measurement of these cells continues; or, after one SCG successfully accesses, when the second indication information indicates that measurement of some cells continues, the measurement of these cells continues; in addition, when the UE continues the measurement of the first target object, the UE may further stop the measurement of all the target objects associated with the conditional trigger cell management indicated by the measurement object configuration information except for the first target object;

according to a second target object that does not need to continue to be measured as indicated by the second indication information, the UE determines to stop measurement of the second target object; in this way, the UE determines to stop measurement of the second target object according to the second target object that does not need to continue to be measured as indicated by the second indication information; for example, after the handover is successful, when the second indication information indicates that measurement of some cells stops (i.e., not to continue), the measurement of these cells stops; or, after one SCG successfully accesses, when the second indication information indicates that measurement of some cells stops, the measurement of these cells stops;

according to the first target object that needs to continue to be measured as indicated by the second indication information, the UE determines to stop measurement of other objects except for the first target object in the target objects; in this way, the UE determines to stop measurement of other objects except for the first target object in the target objects according to the first target object that needs to continue to be measured as indicated by the second indication information; for example, after the handover is successful, the UE stops the measurement of all the target objects associated with the conditional trigger cell management indicated by the measurement object configuration information except for the first target object as indicated by the second indication information (for example, continuing measurement of some target objects); or, after one SCG successfully accesses, the UE stops the measurement of all the target objects associated with the conditional trigger cell management indicated by the measurement object configuration information except for the first target object as indicated by the second indication information (for example, continuing measurement of some target objects).

Optionally, when the preset trigger event includes the cell handover success or the target SCG access success, the first target object includes the current serving cell. Thus, with an example in which the UE determines to continue measurement of the first target object according to the first target object that needs to continue to be measured as indicated by the second indication information, after the handover is successful, when the second indication information indicates that measurement of a serving cell continues, the UE continues the measurement of this serving cell; or, after an SCG successfully accesses, when the second indication information indicates that measurement of a serving cell continues, the UE continues the measurement of this serving cell. In addition, when the UE continues the measurement of the serving cell, the UE may further stop the measurement of all the target objects associated with the conditional trigger cell management indicated by the measurement object configuration information except for the serving cell.

In the measurement configuration method according to one embodiment of the present disclosure, the network device configures measurement configuration information based on conditional trigger cell management for the UE, so that when the UE adopts the conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

The foregoing embodiments illustrate the measurement configuration method in different scenarios, and the corresponding network device will be further described below with reference to the accompanying drawings.

Figure 6:
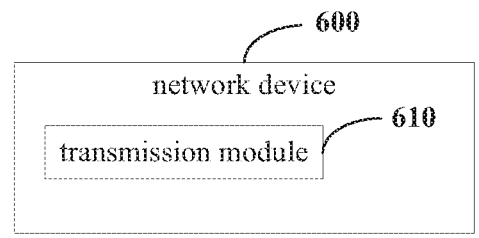
FIG. 6 is a schematic structural diagram of modules of a network device according to an embodiment of the present disclosure.

As shown in FIG. 6, a network device 600 according to an embodiment of the present disclosure can implement details of the measurement configuration method in the above embodiment, and achieve the same effect. The network device 600 specifically includes the following functional modules:

a transmission module 610 configured to transmit measurement object configuration information; where the measurement object configuration information is used to indicate a target object associated with conditional trigger cell management.

The measurement object configuration information includes at least one of the following:

information of a cell identity that does not need to be measured;

information of a frequency identity of the target object;

information of a cell identity of the target object;

first indication information indicating whether the measurement object is applied for the conditional trigger cell management;

reference signal configuration information corresponding to the target object;

layer-3 filter configuration information of the target object;

information of measurement result type of the target object;

a second indication information indicating whether to continue measurement after satisfying at least one preset trigger event.

The network device 600 further includes:

a configuration module configured to configure a preset trigger event for the UE to enable the UE to determine whether to stop measurement of at least one object in the target objects when the preset trigger event is satisfied.

The preset trigger event includes at least one of a cell handover success, a cell handover failure, a target secondary cell group (Secondary Cell Group, SCG) access success, a target SCG access failure, and a radio link failure.

When the preset trigger event is used to enable the UE to determine to stop measurement of all the target objects when the preset trigger event is satisfied.

In case that the preset trigger event includes a cell handover success or a target SCG access success, the preset trigger event is used to enable the UE to determine to stop measurement of objects except for a current serving cell in the target objects, when the cell handover is successful or the target SCG successfully accesses.

When the measurement object configuration information includes the second indication information, the preset trigger event is used to:

enable the UE to determine whether to stop measurement of at least one object of the target objects according to the second indication information when satisfying the trigger event;

enable the UE to determine whether to stop measurement of at least one object of the target objects according to the second indication information when satisfying the trigger event and completing a configuration procedure for the target object.

The preset trigger event is used to:

according to a first target object that needs to continue to be measured as indicated by the second indication information, enable the UE to determine to continue measurement of the first target object;

according to a second target object that does not need to continue to be measured as indicated by the second indication information, enable the UE to determine to stop measurement of the second target object;

according to the first target object that needs to continue to be measured as indicated by the second indication information, enable the UE to determine to stop measurement of other objects except for the first target object in the target objects.

When the preset trigger event includes the cell handover success or the target SCG access success, the first target object includes the current serving cell.

It should be noted that division of various modules of the above network device and the UE are only division of logical functions. In actual implementation, they may be integrated into one physical entity in whole or in part, or may be physically separated. These modules may all be implemented in form of software called by processing elements; they may also all be implemented in hardware; or, some modules may be implemented in the form of software called by processing elements, and some modules may be implemented in hardware. For example, the determining module may be a separate processing element, or it may be integrated and implemented in a certain chip of the above device. In addition, it may also be stored in the form of program codes in the memory of the above device, and a certain processing element of the above device may call the program codes to implement functions of the above determining module. The implementation of other modules is similar. In addition, all or part of these modules may be integrated together, or they may be implemented independently. The processing element described herein may be an integrated circuit with signal processing capabilities. In the implementation process, each step of the above method or each module may be completed by an integrated logic circuit of hardware in the processing element or instructions in the form of software.

For example, the above modules may be one or more integrated circuits configured to implement the above method, such as one or more Application Specific Integrated Circuits (Application Specific Integrated Circuit, ASICs), or one or more digital signal processors (digital signal processor, DSP), one or more Field Programmable Gate Arrays (Field Programmable Gate Array, FPGAs). For another example, when one of the above modules is implemented in the form of calling program codes by a processing component, the processing component may be a general purpose processor, such as a central processing unit (Central Processing Unit, CPU) or other processor that can call the program codes. As another example, these modules may be integrated and implemented in the form of a system-on-a-chip (system-on-a-chip, SOC).

It is worth noting that the network device according to one embodiment of the present disclosure configures measurement configuration information based on conditional trigger cell management for the UE, so that when the UE adopts the conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

In order to better achieve the above purpose, one embodiment of the present disclosure further provides a network device. The network device includes a processor, a memory, and a computer program stored on the memory and executable on the processor. The processor executes the computer program to implement the steps in the foregoing measurement configuration method. One embodiment of the present disclosure further provides a computer readable storage medium. The computer readable storage medium stores a computer program. The computer program is executed by a processor to implement the steps of the foregoing measurement configuration method.

Figure 7:
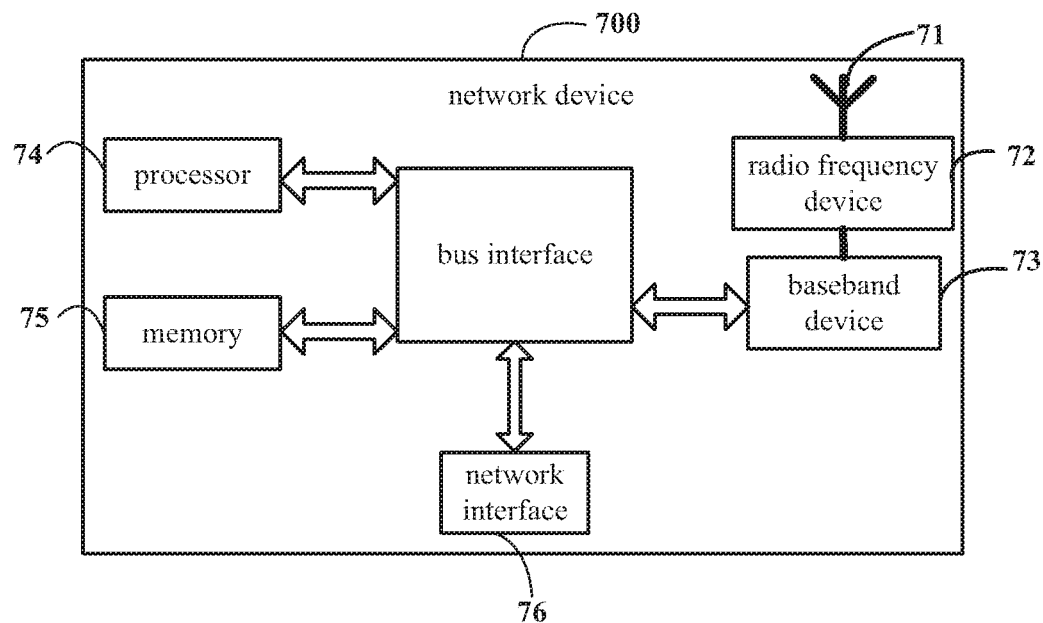
FIG. 7 is a block diagram of a network device according to an embodiment of the present disclosure.

Specifically, one embodiment of the present disclosure further provides a network device. As shown in FIG. 7, the network device 700 includes an antenna 71, a radio frequency device 72 and a baseband device 73. The antenna 71 is coupled with the radio frequency device 72. In the uplink direction, the radio frequency device 72 receives information through the antenna 71, and transmits the received information to the baseband device 73 for processing. In the downlink direction, the baseband device 73 processes the information to be transmitted and transmits it to the radio frequency device 72. The radio frequency device 72 processes the received information and transmits it via the antenna 71.

The above band processing device may be located in the baseband device 73, and the method performed by the network device in the above embodiment may be implemented in the baseband device 73. The baseband device 73 includes a processor 74 and a memory 75.

The baseband device 73 may include, for example, at least one baseband board on which chips are disposed. As shown in FIG. 7, one of the chips is, for example, a processor 74 coupled with the memory 75 to call a program in the memory 75 to execute operations of the network device in the above method embodiment.

The baseband device 73 may further include a network interface 76 for interacting with the radio frequency device 72, such as a common public radio interface (common public radio interface, CPRI).

The processor herein may be a processor or a collective name of multiple processing elements. For example, the processor may be a CPU, an ASIC, or one or more integrated circuits configured to implement the method performed by the above network device, such as one or more DSPs, or one or more field programmable gate arrays (FPGAs). The memory may be a memory or a collective name for a plurality of storage elements.

The memory 75 may be either volatile memory or non-volatile memory, or may include both volatile and non-volatile memories. The non-volatile memory may be a Read-Only Memory (Read-Only Memory, ROM), a Programmable ROM (Programmable ROM, PROM), an Erasable PROM (Erasable PROM, EPROM), electrically erasable programmable read only memory (Electrically EPROM, EEPROM) or flash memory. The volatile memory may be a Random Access Memory (Random Access Memory, RAM), which is used as an external cache. By way of example and not limitation, many forms of RAM are available, such as static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), Synchlink DRAM (Synchlink DRAM, SLDRAM), Direct Rambus RAM (Direct Rambus RAM, DRRAM). The memory 75 described herein is intended to include, without being limited to, these and any other suitable types of memory.

Specifically, the network device of one embodiment of the present disclosure further includes: a computer program stored on the memory 75 and executable on the processor 74. The processor 74 calls the computer program in the memory 75 to execute the method executed by various modules shown in FIG. 6.

Specifically, the computer program is called by the processor 74 to perform: transmitting measurement object configuration information; where the measurement object configuration information is used to indicate a target object associated with conditional trigger cell management.

The measurement object configuration information includes at east one of the following:

information of a cell identity that does not need to be measured;

information of a frequency identity of the target object;

information of a cell identity of the target object;

first indication information indicating whether the measurement object is applied for the conditional trigger cell management;

reference signal configuration information corresponding to the target object;

layer-3 filter configuration information of the target object;

information of measurement result type of the target object;

a second indication information indicating whether to continue measurement after satisfying at least one preset trigger event.

The computer program is called by the processor 74 to perform: configuring a preset trigger event for the UE to enable the UE to determine whether to stop measurement of at least one object in the target objects when the preset trigger event is satisfied.

The preset trigger event includes at least one of a cell handover success, a cell handover failure, a target secondary cell group (Secondary Cell Group, SCG) access success, a target SCG access failure, and a radio link failure.

The preset trigger event is used to enable the UE to determine to stop measurement of all the target objects when the preset trigger event is satisfied.

In case that the preset trigger event includes a cell handover success or a target SCG access success, the preset trigger event is used to enable the UE to determine to stop measurement of objects except for a current serving cell in the target objects, when the cell handover is successful or the target SCG successfully accesses.

When the measurement object configuration information includes the second indication information, the preset trigger event is used to:

enable the UE to determine whether to stop measurement of at least one object of the target objects according to the second indication information when satisfying the trigger event;

enable the UE to determine whether to stop measurement of at least one object of the target objects according to the second indication information when satisfying the trigger event and completing a configuration procedure for the target object.

The preset trigger event is used to:

according to a first target object that needs to continue to be measured as indicated by the second indication information, enable the UE to determine to continue measurement of the first target object;

according to a second target object that does not need to continue to be measured as indicated by the second indication information, enable the UE to determine to stop measurement of the second target object;

according to the first target object that needs to continue to be measured as indicated by the second indication information, enable the UE to determine to stop measurement of other objects except for the first target object in the target objects.

When the preset trigger event includes the cell handover success or the target SCG access success, the first target object includes the current serving cell.

The network device may be a Base Transceiver Station (Base Transceiver Station, BTS) in Global System of Mobile communication (Global System of Mobile communication, GSM) or Code Division Multiple Access (Code Division Multiple Access, CDMA), a NodeB (NodeB, NB) in Wideband Code Division Multiple Access (Wideband Code Division Multiple Access, WCDMA), an Evolutional Node B (Evolutional Node B, eNB or eNodeB) in LTE, a relay station, an access point, or a base station in a future 5G network, which is not limited herein.

The network device according to one embodiment of the present disclosure configures measurement configuration information based on conditional trigger cell management for the UE, so that when the UE adopts the conditional trigger cell management, according to the measurement object configuration information in the measurement configuration information configured by the network device, the UE starts the measurement of the target cell; according to the trigger event for stopping measurement in the measurement configuration information, when the trigger event is satisfied, the UE determines whether to stop measurement of at least one object of the target objects, thereby saving additional signaling configuration for measurement and achieving the effect of saving power for the UE.

Persons having ordinary skill in the art may learn that, taking into account various embodiments of the present disclosure, units and algorithm steps described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

Persons having ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view; the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the steps, or some steps in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

in addition, it should be pointed out that, in the device and method of the present disclosure, it is obvious that each component, or each step may be subdivided, and/or, recombined. These subdivision, and/or, recombination should be taken as equivalent solution of the present disclosure. Besides, steps for performing foregoing series of processes may be executed, according to described time sequence. However, time sequential execution is not necessary. Some steps may be performed in parallel, or may be executed independently. Persons having ordinary skill in the art may understand that all the steps, or components, any step or component may be implemented in hardware, firmware, software, or a combination thereof, in any computing device (including a processor, storage medium, and so on), or in a network of computing device, which may be implemented by persons having ordinary skill in the art, after reading descriptions of the present disclosure and using their basic programming skills.

Thus, objectives of the present disclosure may be achieved by running one program, or a group of programs in any computing device. The computing device may be a known common device. Thus, the objectives of the present disclosure may also be implemented by a program product, which includes program codes implementing the method or device. That is, such program product may also form the present disclosure. And, a storage medium storing such program product also form the present disclosure. It is obvious that the storage medium may be any known storage medium, or any storage medium to be developed. It should also be pointed out that, in the devices and methods of the present disclosure, it is obvious that each component, or each step may be further subdivided, and/or, may be recombined. These subdivision, and/or, recombination should be taken as the equivalent solution of the present disclosure. Besides, steps for executing foregoing series of process may be performed, according to described time sequence. But it is not necessary to perform the steps according to time sequence. Some steps may be performed in parallel, or may be performed independently.

Foregoing describes optional implementation modes of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A measurement method, operable by a user equipment (UE), comprising:
   receiving measurement object configuration information;
   when adopting conditional trigger cell management, according to the measurement object configuration information, starting measurement of a target object; wherein the target object is at least one of objects indicated by the measurement object configuration information;
   when satisfying a preset trigger event, determining to stop measurement of at least one object in the target object;
   wherein the preset trigger event comprises at least one of a cell handover success or a target secondary cell group (SCG) access success.

2. The measurement method according to claim 1, wherein the measurement object configuration information comprises at least one of the following:
   information of a cell identity that does not need to be measured;
   information of a frequency identity of the target object;
   information of a cell identity of the target object;
   first indication information indicating whether a measurement object is applied for the conditional trigger cell management;
   reference signal configuration information corresponding to the target object;
   layer-3 filter configuration information of the target object;
   information of measurement result type of the target object;
   a second indication information indicating whether to continue measurement after satisfying at least one preset trigger event.

3. The measurement method according to claim 1, wherein the preset trigger event is predefined, or the preset trigger event is configured by a network device.

4. The measurement method according to claim 1, wherein the step of when satisfying a preset trigger event, determining to stop measurement of at least one object in the target object, comprises:
   when satisfying the preset trigger event, determining to stop measurement of all target objects.

5. The measurement method according to claim 1, wherein, the step of when satisfying a preset trigger event, determining whether to stop measurement of at least one object in the target object, comprises:
   when a cell handover is successful or a target SCG successfully accesses, determining to stop measurement of objects except for a current serving cell in the target object.

6. The measurement method according to claim 2, wherein when the measurement object configuration information comprises second indication information, the step of when satisfying a preset trigger event, determining to stop measurement of at least one object in the target object, comprises one of the following:
   when satisfying the preset trigger event, determining whether to stop measurement of at least one object of the target object according to the second indication information;
   when satisfying the preset trigger event and completing a configuration procedure for the target object, determining to stop measurement of at least one object of the target object according to the second indication information.

7. The measurement method according to claim 6, wherein the step of determining to stop measurement of at least one object of the target object according to the second indication information, comprises:
   according to a second target object that does not need to continue to be measured as indicated by the second indication information, determining to stop measurement of the second target object.

8. A user equipment (UE), comprising: a processor, a memory, and a computer program stored on the memory and executable on the processor; wherein the computer program is executed by a processor to implement:
   receiving measurement object configuration information;
   when adopting conditional trigger cell management, according to the measurement object configuration information, starting measurement of a target object; wherein the target object is at least one of objects indicated by the measurement object configuration information;
   when satisfying a preset trigger event, determining to stop measurement of at least one object in the target object;
   wherein the preset trigger event comprises at least one of a cell handover success or a target secondary cell group (SCG) access success.

9. The UE according to claim 8, wherein the measurement object configuration information comprises at least one of the following:
   information of a cell identity that does not need to be measured;
   information of a frequency identity of the target object;
   information of a cell identity of the target object;
   first indication information indicating whether a measurement object is applied for the conditional trigger cell management;
   reference signal configuration information corresponding to the target object;
   layer-3 filter configuration information of the target object;
   information of measurement result type of the target object;
   a second indication information indicating whether to continue measurement after satisfying at least one preset trigger event.

10. The UE according to claim 8, wherein the processor is configured to:

when satisfying the preset trigger event, determine to stop measurement of all target objects.

11. The UE according to claim 9, wherein when the measurement object configuration information comprises second indication information, the processor is configured to perform at least one of the following:
when satisfying the preset trigger event, determining to stop measurement of at least one object of the target object according to the second indication information;
when satisfying the preset trigger event and completing a configuration procedure for the target object, determining to stop measurement of at least one object of the target object according to the second indication information.

12. The UE according to claim 11, wherein the processor is configured to:
according to a second target object that does not need to continue to be measured as indicated by the second indication information, determining to stop measurement of the second target object.

13. The UE according to claim 8, wherein the processor is configured to:
when a cell handover is successful or a target SCG successfully accesses, determine to stop measurement of objects except for a current serving cell in the target object.

14. The UE according to claim 8, wherein the preset trigger event is predefined, or the preset trigger event is configured by a network device.

15. A non-transitory computer readable storage medium, comprising a computer program stored thereon; wherein the computer program is executed by a processor to implement:
receiving measurement object configuration information;
when adopting conditional trigger cell management, according to the measurement object configuration information, starting measurement of a target object; wherein the target object is at least one of objects indicated by the measurement object configuration information;
when satisfying a preset trigger event, determining to stop measurement of at least one object in the target object;
wherein the preset trigger event comprises at least one of a cell handover success or a target secondary cell group (SCG) access success.

16. The computer readable storage medium according to claim 15, wherein the measurement object configuration information comprises at least one of the following:
information of a cell identity that does not need to be measured;
information of a frequency identity of the target object;
information of a cell identity of the target object;
first indication information indicating whether a measurement object is applied for the conditional trigger cell management;
reference signal configuration information corresponding to the target object;
layer-3 filter configuration information of the target object;
information of measurement result type of the target object;
a second indication information indicating whether to continue measurement after satisfying at least one preset trigger event.

17. The computer readable storage medium according to claim 15, wherein the preset trigger event is predefined, or the preset trigger event is configured by a network device.

18. The computer readable storage medium according to claim 15, wherein the computer program is executed by the processor to implement:
when satisfying the preset trigger event, determining to stop measurement of all target objects.

19. The computer readable storage medium according to claim 15, wherein the computer program is executed by the processor to implement:
when a cell handover is successful or a target SCG successfully accesses, determining to stop measurement of objects except for a current serving cell in the target object.

20. The computer readable storage medium according to claim 16, wherein when the measurement object configuration information comprises second indication information, the computer program is executed by the processor to implement one of the following:
when satisfying the preset trigger event, determining to stop measurement of at least one object of the target object according to the second indication information;
when satisfying the preset trigger event and completing a configuration procedure for the target object, determining to stop measurement of at least one object of the target object according to the second indication information.

* * * * *